United States Patent

[11] 3,630,190

| [72] | Inventor | Samuel A. Baker |
| | | Great Neck, N.Y. |
| [21] | Appl. No. | 19,245 |
| [22] | Filed | Mar. 13, 1970 |
| [45] | Patented | Dec. 28, 1971 |
| [73] | Assignee | Julius Schmid Inc. |
| | | New York, N.Y. |

[54] INTRAUTERINE PROBE
5 Claims, 2 Drawing Figs.

[52] U.S. Cl. ..................................................... 128/2,
128/304, 128/341
[51] Int. Cl. ........................................................ A61b 5/10
[50] Field of Search ........................................... 128/2 R,
303, 304, 341, 130, 131; 206/63.2

[56] References Cited
UNITED STATES PATENTS

| 3,394,699 | 7/1968 | Koett | 128/2 R |
| 3,480,003 | 11/1969 | Crites | 128/2 R |
| 343,306 | 6/1886 | Francke | 128/341 |
| 3,368,549 | 2/1968 | Barr et al. | 128/2 R |
| 1,144,220 | 6/1915 | Maguire | 128/341 |
| 1,672,816 | 6/1928 | Kohr | 128/304 |
| 1,701,616 | 2/1929 | Gross | 128/304 |
| 3,112,031 | 11/1963 | Stewart | 206/63.2 |
| 3,235,069 | 2/1966 | Bennett et al. | 206/63.2 |

*Primary Examiner*—Aldrich F. Medbery
*Attorney*—Darby & Darby

ABSTRACT: A presterilized intrauterine probe manufactured from a biologically inert plastic material is described which device is particularly adapted to probe the cervical canal and uterus to determine whether the uterus is anteverted or retroverted and to determine the distance between the cervical os and the fundus of the uterus. This intrauterine probe comprises a flexible stem portion having annular calibrated means and handle means at the proximal end of said stem portion.

FIG. 1
FIG. 2
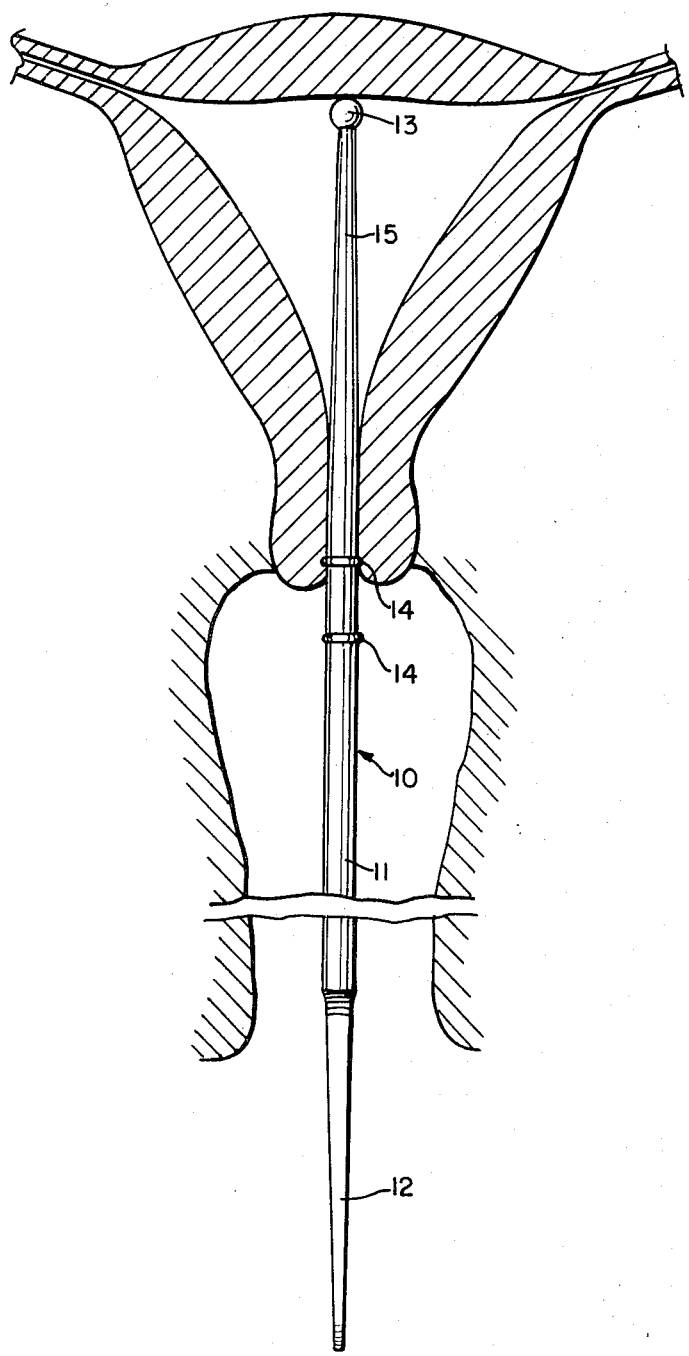
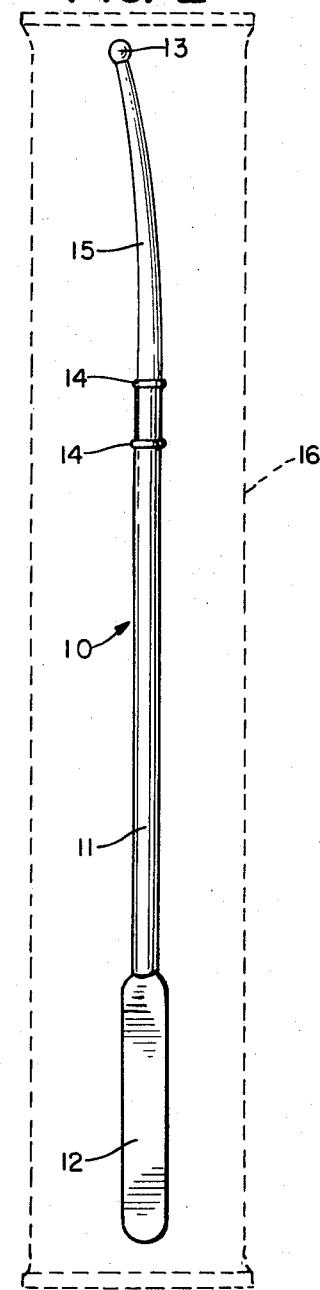
INVENTOR.
SAMUEL BAKER
BY Darby & Darby
ATTORNEYS

INTRAUTERINE PROBE

This invention relates to an intrauterine probe.

It has been known for many years that the presence of mechanical inserts in the uterus will prevent conception. The intrauterine inserts must be introduced into the cavum uteri through the cervical canal. To function effectively the intrauterine device must be correctly inserted by the gynecologist to preclude involuntary rejection or accidental expulsion.

In fitting a patient with an intrauterine device several preliminary investigations are performed by the gynecologist including probing the cervical canal with an intrauterine probe. These investigations include determination of whether the uterus is anteverted or retroverted, the approximate distance between the external cervical os and the fundus of the uterus so that the intrauterine device can be properly inserted within the uterine cavity, and the presence or absence of tumors or other obstructions of the uterus.

The intrauterine probes currently available are constructed of a rigid material, generally a metal. Such a construction has its drawbacks because the lack of flexibility of the probe may result in injury to the uterus, including perforation of the uterus wall, particularly where the uterus is not in its normal position or there is an obstruction.

The present invention provides a diagnostic instrument particularly adapted for exploration of the uterus that does not require sterilization by the gynecologist or physician, permits more accurate measurement of the distance between the external cervical os the the fundus of the uterus and reduces the risk of injury and irritation to the uterus during its use.

Accordingly, one object of the present invention is to provide an intrauterine probe, particularly adapted for use in the fitting of intrauterine devices.

Another object of the present invention is to provide a presterilized, flexible intrauterine probe made of an inert plastic material.

Other objects of the present invention will become apparent from the following description and drawings in which:

FIG. 1 is a diagrammatic frontal view of the female pelvic region illustrating the insertion of the intrauterine probe of the present invention; and FIG. 2 is a plan view of the sterilized assembly containing the intrauterine probe of the present invention.

Referring now in more detail and by reference characteristics to the drawings, which illustrate practical embodiments of the present invention, FIG. 1 illustrates an intrauterine probe 10, comprising a flexible stem portion 11 having a handle or grip 12 at its proximal end, and at its opposite end a tapered curved portion 15, which terminates at its distal end in a spherical head or nodule 13 which is designed to reduce irritation and scraping of the cervical canal and perforation of the uterus. Stem portion 11 has a plurality of annular ridges 14 spaced apart from each other by a predetermined distance, with the annular ridge closest to the distal tip of stem portion 11 being located approximately 2-5/16 inches from the tip. This is considered to be about the normal internal length between the external cervical os and the fundus of the uterus as illustrated in FIG. 1. The annular ridges are spaced apart at any predetermined distance, preferably not greater than about one-half inch, in order to permit more accurate determination of the distance between the external cervical os and the fundus of the uterus. Knowledge of this distance will facilitate insertion of an intrauterine device such as that described in U.S. Pat. No. 3,374,788.

The diagnostic probe is formed of a biologically inert synthetic resin (e.g. polyethylene, polypropylene etc.) which is of sufficient overall thickness and polymeric density so as to be resiliently flexible so that it will readily bend in conformity with the contours of the vagina and cervical canal but is sufficiently rigid that it can be inserted into the cervical canal and will not collapse under the contractile muscular pressure of the walls thereof. The overall dimensions of the intrauterine probe are not critical. As a practical matter probe 10 must have a length so that when the distal end of the probe 10 contacts the fundus of the uterus the proximal end of the probe including handle 12 extend outside of the body of the patient. A probe of suitable dimensions is one having a length of about 8-1/4 inches and an average outside diameter of approximately 0.142 inches and for stem portion 11 and a diameter of about 0.135 inches at the end of curved portion 15 which is integral with spherical head 13. The diameter of spherical head 13 is of the order of 0.90 inches.

Turning now to FIG. 2, there is shown the diagnostic sound of the present invention enclosed within a flat rectangular envelope 16 preferably made of a heat-sealable transparent synthetic resin sheathing. After intrauterine probe 10 has been placed in envelope 16 and the envelope heat sealed, this assembly is sterilized in any suitable manner. The sterilization can be performed in a number of different ways so that the intrauterine probe 10 and the interior of the envelope 16 are surgically sterile and the envelope 16 preserves the intrauterine probe 10 in such sterile condition during subsequent storage and handling.

It is to be understood that various changes and modifications may be made by those skilled in the art without departing from the spirit of the invention.

I claim:

1. A probe for intrauterine sounding of a patient comprising a single elongated piece of flexible plastic material formed of a biologically inert material with a retentive memory and having a size and shape so as to extend at its distal end through the external cervical as into the uterus and at its proximal end project outside of the body of the patient to provide an external portion which can be grasped for manipulation, said probe formed with;
   a. nodule means at the distal end,
   b. hand gripping means at the proximal end which extend outside of the body of the patient, and
   c. at least one calibrated marking means on the probe located between the distal and proximal ends at a position which is normally viewable from outside of the body of the patient for gauging the distance from the external cervical as to the fundus of the uterus the portion of the probe between said marking means and said distal end curving off of the major longitudinal axis of the remainder of the probe and being of gradually diminishing cross section toward said distal end.

2. An intrauterine probe according to claim 1 further comprising a rupturable envelope adapted to accommodate sterilization of said diagnostic probe in the interior of said envelope and enclosing a seal around said probe.

3. An intrauterine probe according to claim 1 wherein said calibrated marking means comprises annular ridges which are spaced apart.

4. A probe as in claim 1 wherein said hand gripping means comprises a flattened section at the proximal end of the probe, said flattened section and said curved portion being substantially coplanar.

5. A probe as in claim 4 wherein the cross-sectional area of said flattened section diminishes toward the proximal end of the probe.

* * * * *